Feb. 26, 1957
O. A. JOHNSON
2,782,811
SWIVELING BLADE-GUIDE ATTACHMENT
FOR CONTOUR SAWING MACHINES
Filed May 11, 1954
3 Sheets-Sheet 1
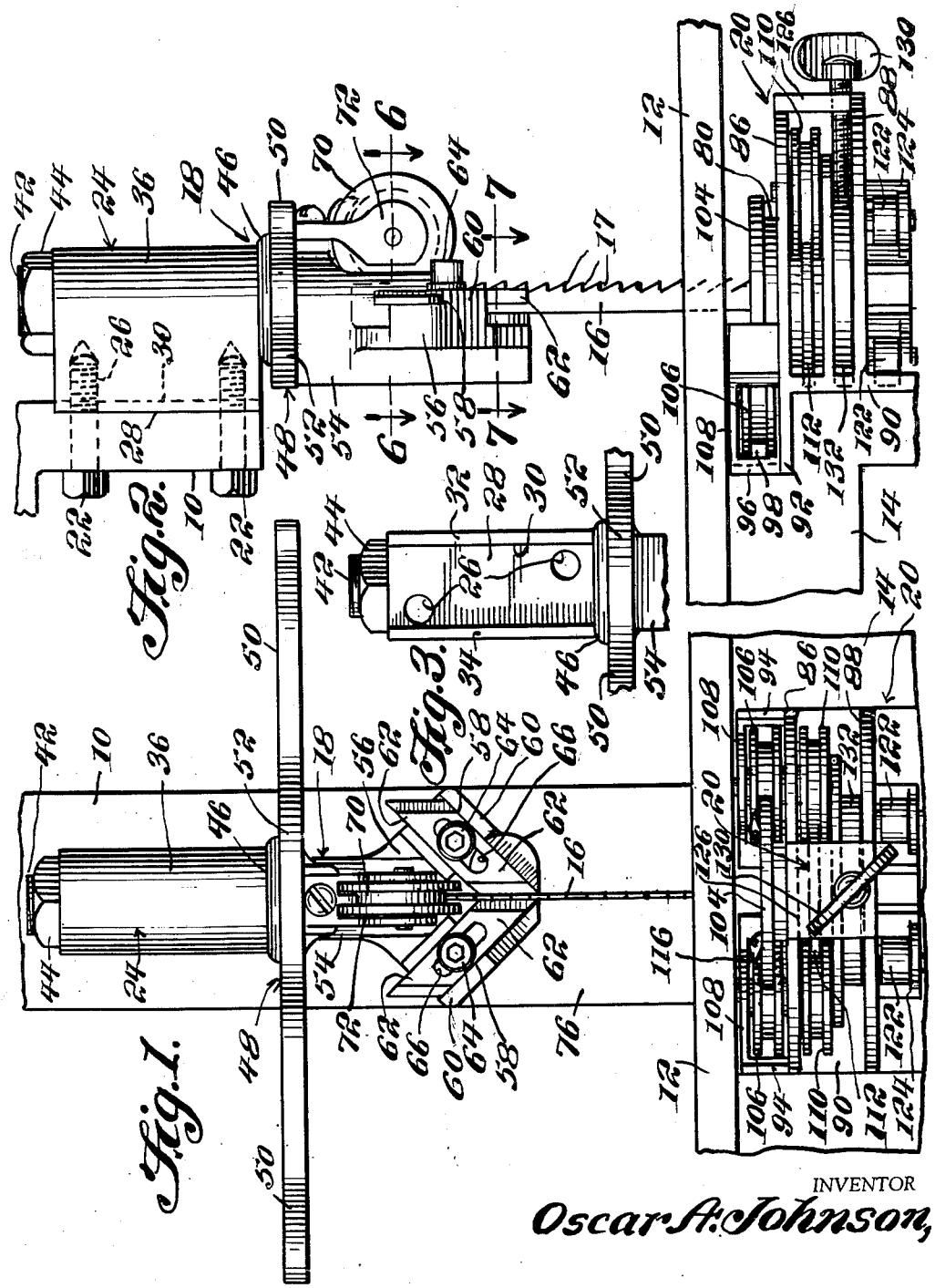
INVENTOR
Oscar A. Johnson,
BY
McMorrow, Berman & Davidson
ATTORNEYS

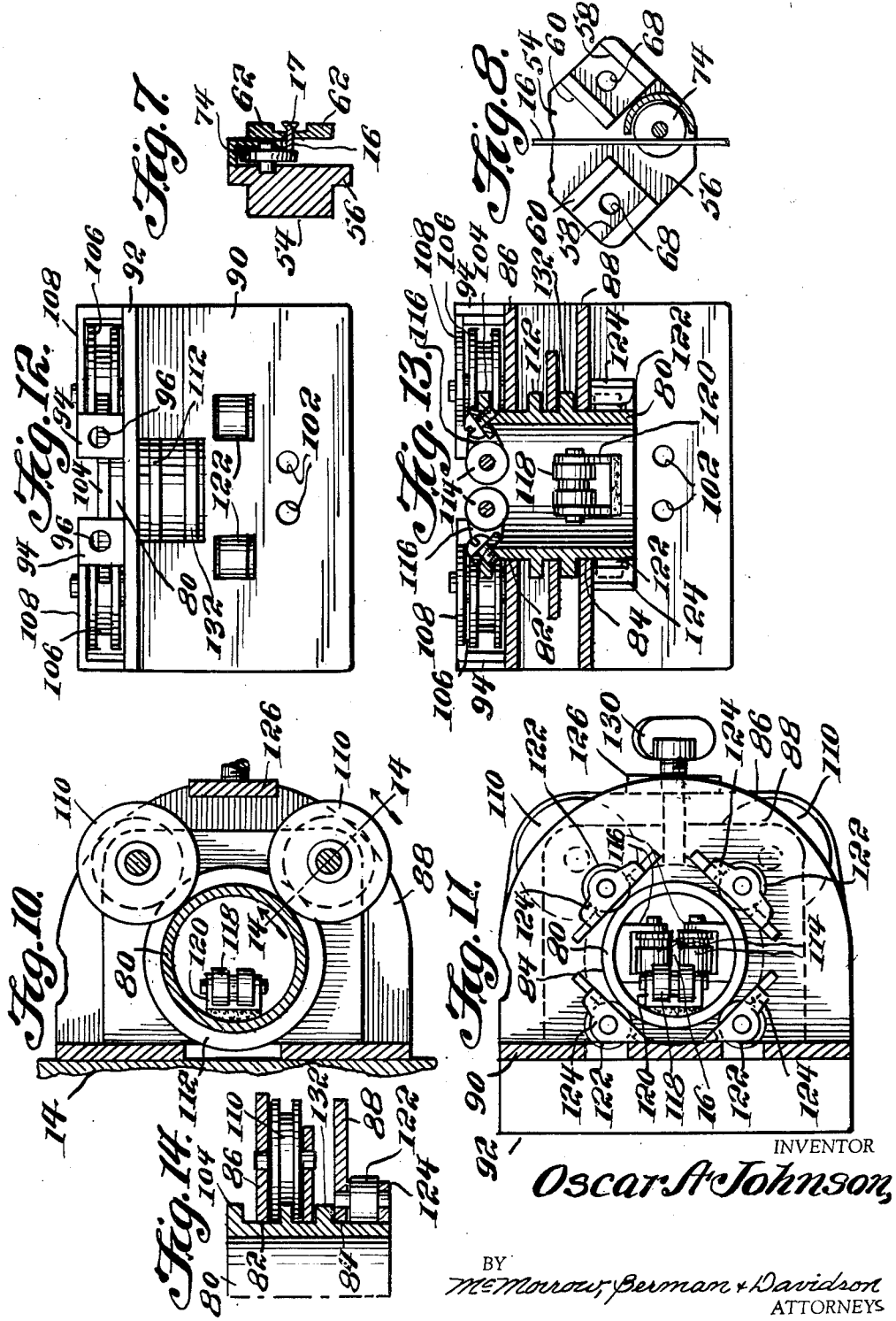

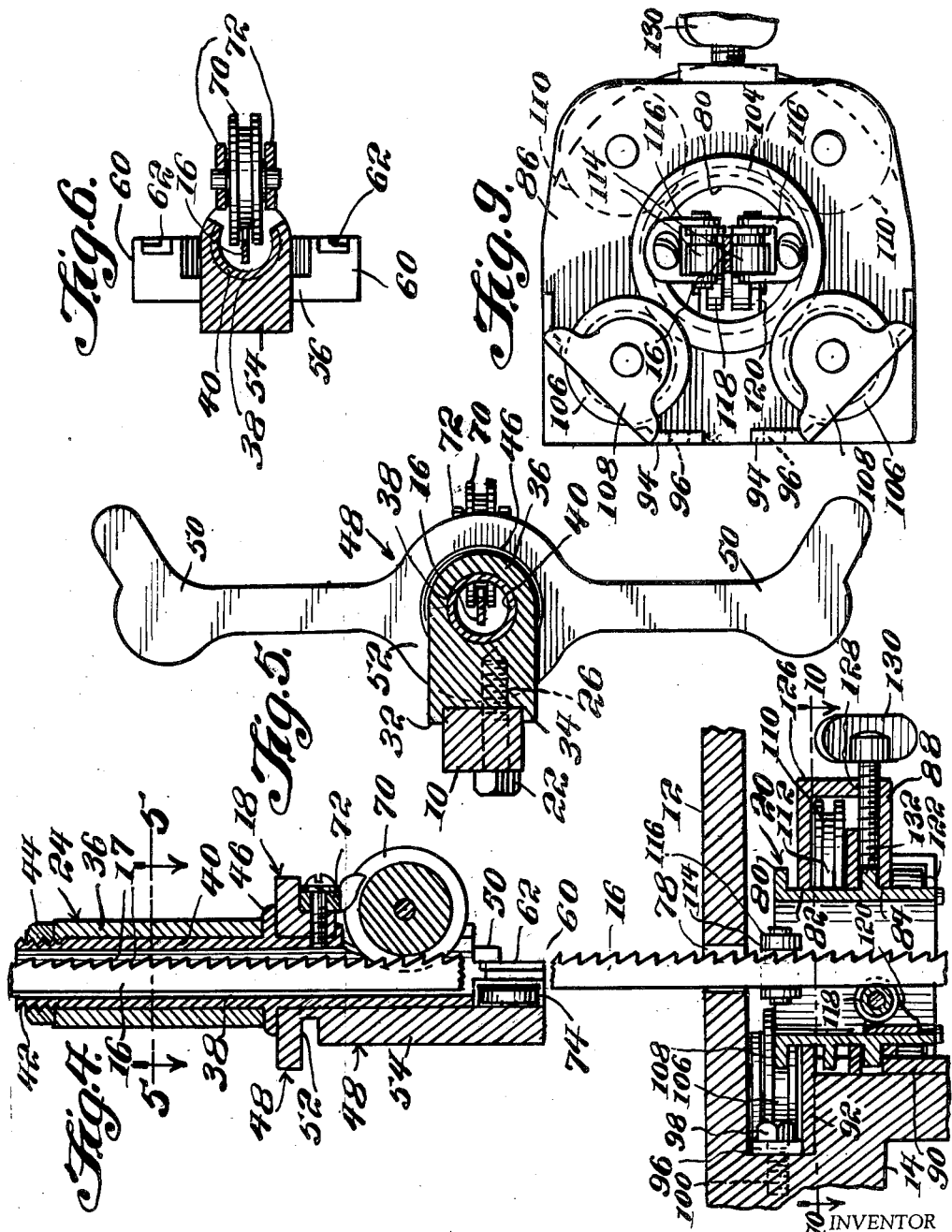

United States Patent Office 2,782,811
Patented Feb. 26, 1957

2,782,811

SWIVELING BLADE-GUIDE ATTACHMENT FOR CONTOUR SAWING MACHINES

Oscar A. Johnson, South Norwalk, Conn.

Application May 11, 1954, Serial No. 428,997

1 Claim. (Cl. 143—17)

This invention relates to contour sawing machines, of the band or jig saw type, and more particularly to an attachment for such machine for angularly disposing the saw blade so as to enable the operator to cut the work from any desired side of the machine.

The attachment is provided with saw guides that are fixed in one position to the cutting edge of the saw blade, or one that is fixed at a 30° angle to one side or the other, usually to the right side. Such a conventional contour saw is limited as to the depth of cut by the size or depth of the throat of the machine so that on large sheets of material some cuts cannot be reached unless the sheet of material is turned over and remarked to complete the desired sawing operation. There are other cuts that cannot be reached by the conventional contour sawing machine such as large straight line cuts, large contour or circular cutting, cuts which require relatively sharp angles since the large sheet from which the work is to be cut will be stopped by the throat of the machine by having one edge abutting thereagainst as the work is turned to the desired positions.

It is therefore an object of this invention to provide an attachment device which will permit the line, contour or circle to be cut on a large sheet of material without the material being stopped by abutting against the throat of the machine.

It is a further object of this invention to provide an attachment for a contour sawing machine which will enable the existing machine to perform work on a sheet of material approximately twice the size of the depth of the throat of the machine, for instance, on a machine of a 36 inch throat, the operator will be enabled to cut a 72 inch circle.

It is a still further object of this invention to provide an attachment for a contour sawing machine which may be easily and readily secured to the existing machine without extensive modification of the machine.

It is yet another object of this invention to provide an attachment which may be locked in any desired rotated position so that the cutting edge of the blade may extend at any desired angular position with respect to the horizontal plane of the work surface or table of the machine.

Another and still further object of this invention is to provide an attachment whereby a desired cut line may be followed by the saw blade when the sheet of material upon which the cut line is drawn is of large size and the cut line is irregular without removing the sheet of material from the machine and making the cut in one continuous operation.

Further objects and advantages will become apparent from the following detailed description, forming the specification, and taken in conjunction with the accompanying drawings in which:

Figure 1 is a front elevational view of the attachment as applied to an existing sawing machine and embodying this invention;

Figure 2 is a side elevational view of Figure 1;

Figure 3 is a partial rear elevational view showing the upper portion of the upper saw guide assembly as seen in Figure 1;

Figure 4 is a vertical section taken centrally through Figure 1 and looking to the right;

Figure 5 is a sectional view taken on line 5—5 of Figure 4;

Figure 6 is a sectional view taken on line 6—6 of Figure 2;

Figure 7 is a sectional view taken on line 7—7 of Figure 2;

Figure 8 is an enlarged view of the lower portion of the upper guide assembly of Figure 1, partially in section, and with the saw blocks shown in Figure 1 removed;

Figure 9 (sheet 2) is a top plan view of the lower guide assembly, somewhat enlarged from the showing in Figure 1;

Figure 10 (sheet 1) is a cross sectional view taken on line 10—10 of Figure 4;

Figure 11 is a bottom plan view of the lower guide assembly;

Figure 12 is a rear elevational view of the lower guide assembly;

Figure 13 is a vertical cross sectional view taken centrally through Figure 12; and Figure 14 is a cross sectional view taken on line 14—14 of Figure 10.

With continued reference to the drawings, and with special attention to Figures 1, 2 and 4, there are shown the portions of the conventional contour sawing machine necessary to illustrate the manner in which the attachment of this invention is applied thereto and the function of this attachment with relation to those parts of the contour sawing machine illustrated. The parts of the sawing machine shown include the upper frame 10 disposed above the work surface or work table 12 and the lower frame 14 disposed immediately beneath the work table 12, and the saw or saw blade 16 having the usual teeth formed along one longitudinal edge for purposes of cutting the work fed to the machine, the saw 16 mounted in the contour sawing machine so as to move in a vertical path.

The attachment of this invention comprises, generally, two major components, namely, an upper assembly, generally indicated at 18, and a lower guide assembly, generally indicated at 20, the upper and lower guide assemblies acting in concert upon the saw or saw blade 16 to provide a rotary guide for the cutting blade 16 as will appear from the following description of the component parts of the assemblies and their manner of operation.

Considering first the construction of the upper guide assembly 18, it will be seen that the assembly is carried by the upper frame 10, as by bolts 22 passing through the lower extending portion of the upper frame 10 and into suitably threaded apertures in the upper guide assembly housing 24; these apertures 26 are shown in Figure 3 as being provided on the flattened rear side 28 of the otherwise cylindrical housing 24. The housing 24 is provided, on its flattened side 28, with a recess 30 in which is received the portion of the upper frame to which the upper guide assembly is secured by the bolts 22, as clearly shown in Figure 5. In order to space the cylindrical portion of the housing 24 from the upper frame 10, the sides of the housing are extended rearwardly by parallel straight sides 32 and 34 to the flattened end or side 28.

The rounded or cylindrical portion 36 of the housing 24 is provided with a central circular bore 38 therethrough, and into which bore is fitted a sleeve 40 extending beyond the housing at either end thereof. The upper end 42 of the sleeve 40 is externally threaded on its portion extending beyond the bore 38 in the housing 24 to receive a lock nut 44 thereon so that the lock nut will engage with the upper end of the cylindrical portion 36 of the housing 24 to lock the sleeve 40 against rotation within the bore 38, and the lock nut 44 also tightens the housing 24 against a flange 46 integrally formed on the sleeve 40 intermediate its ends with the lower end of the housing 44 resting upon the upper surface of this flange 46. It should be borne in mind, that the sleeve 40 is rotatable within the bore 38 of the housing 24 and locked by the lock nut 44 to prevent its rotation within the bore 38.

A handle assembly 48 is made fast to the sleeve 40 on that portion of the sleeve extending below the flange 46 and beyond the lower end of the housing 24 so that upon turning of the handle assembly 48 the sleeve 40 will turn therewith. A pair of oppositely disposed arms 50 extending from an enlarged arcuate portion 52 at the end of the handle assembly 48 adjacent the flange 46 and in closely spaced relation thereto provides means by which the handle assembly, and hence the sleeve 40 may be rotated within the bore 38 of the housing 24.

Dependingly carried by the enlarged arcuate portion 52 of the handle assembly is an elongated guide block or support 54 partially surrounding and extending beyond the end of the sleeve 40 and open to one side as well as being formed in generally diamond shape at its lower body portion 56. Adjacent the lower converging sides of the body 56 are provided a pair of recesses 58 (Figure 8) which are parallel with the converging sides of the body 56 and are formed in a saw block guide 60 carried by the body portion 56 of the support block 54. A pair of conventional saw guides 62 is provided with one of the saw guides 62 slidably received in each of the recesses 58 adjustably held therein by cap screws 64 passing through elongated slots 66 formed in each of the saw guides 62 and the screws 64 then entering a suitable threaded aperture 68 (Figure 8) formed in the recess 58 of the saw guide block 60. This adjustment is for the purpose of maintaining the cutting blade 16 in its vertical path of movement between the saw guides 62. In this latter connection, the saw guides 62 can be of the flat or roller type. Carried by the front or open portion of the support block 52 is a grooved wheel 70 journaled in a fork 72 mounted for pivotal movement upon the block support 54 at the front thereof and immediately below the arcuate portion 52 of the handle assembly 48. The purpose of the grooved wheel 70 is to keep the blade from jumping out of the saw guides 62.

It will be noted that the cutting or saw blade 16 passes through the bore 38 provided by the housing 24 and also passes through the entire length of the sleeve 40. In order to provide more efficient operation of the cutting blade 16 while in its vertical movement through the sleeve 40, a back-up bearing 74 (Figures 7 and 8) in the form of a circular wheel journaled for rotation on the lowermost portion of the body 56 of the support block 54 in such a manner as to have the edge of the cutting blade 16 remote from the toothed edge ride upon the exposed flat surface of the back-up bearing 74, thus helping to maintain the blade 16 in its vertical path of movement.

From the foregoing, it should be noted that the cutting blade 16 will be rotated to the same degree as the sleeve 40 by the arms 50 of the handle assembly 48, and may be locked in any desired angular position by tightening the lock nut 44 so as to prevent further rotation of the sleeve 40 with respect to the housing 24. When the lock nut 44 does not prevent the rotation of the sleeve 40, movement of the arms 50 of the handle assembly 48 will cause angular movement of the cutting blade 16 so that when a sheet of material to be fed into the machine is placed upon the work table 12, various arcuate or circular cuts can be made by causing rotation of the cutting blade 16 so as to follow an irregular marking upon the sheet of material to be worked depicting the line of cut desired without the operator removing the material from the machine, or if the material is of a very large size, then the continuous cut may be made without the sheet fetching against the throat 76 of the machine.

Further, one of the primary objects of this invention, namely, to enable the operator of a contour sawing machine to accomplish continuous cutting on a large sheet of material, in which the dimension of the sheet of material worked upon is greater than the throat size of the machine may be accomplished by the rotational movement of the upper guide assembly as set forth hereinbefore and in functional cooperation with the lower guide assembly, the structure and function of which follows.

The saw blade or cutting blade 16 extends continuously from its position through the sleeve 40 of the upper guide assembly 18 through the usual opening 78 extending transversely through the work table 12 of the machine, and the blade then continues to extend downwardly through a rotating sleeve 80 carried in aligned openings 82 and 84 (Figures 4 and 13) in flanges 86 and 88 respectively extending laterally from a back plate 90, the flanges 86 and 88 being in spaced parallel relation and extending in a plane parallel with the horizontal plane of the work table 12. The flange 86 constitutes a top flange for the back plate 90 and extends beyond the face of the back plate remote from the face which carries both the flanges 86 and 88 for a short distance to define a rectangular extension 92. The longitudinal edge of the extension 92 remote from the back plate 90 carries a pair of spaced upstanding ears or lugs 94 (Figures 9 and 12) in which are provided openings 96 therethrough through which a bolt 98 (Figure 4) is inserted in each of the openings 96 and enters suitable threaded openings 100 in the lower frame 14 to secure the lower guide assembly upon the lower frame. It should be noted that the lower frame is recessed so as to receive the extension 92 of the upper or top flange 86 while the back plate 90 is in face-to-face abutment with the vertical face of the lower frame, as clearly shown in Figure 4. To further secure the lower guide assembly 20 upon the lower frame 14, there is provided adjacent the lower end of the back plate 90 a pair of horizontally aligned spaced openings 102 (Figures 12 and 13) to receive bolts similar to bolt 98 which will enter suitable threaded openings in the lower frame 14, the bolt and openings in the lower frame not being shown. The lower guide assembly 20 is so carried by the lower frame 14 that the sleeve 80 is in coaxial alignment with the sleeve 40 of the upper guide assembly 18 and the cutting blade 16 may extend in a vertical plane centrally through both the sleeves 40 and 80. The sleeve 80 is provided at its upper terminal end with an annular flange 104 extending laterally therefrom. The outer periphery of the flange 104 rides in the grooves of a pair of grooved wheels 106 journaled in bearing plates 108. Plates 108 extend laterally in a horizontal plane parallel to the plane of the top flange 86 and are maintained in spaced relation therewith by the ears or lugs 94, the plates 108 extending from the ears or lugs toward the sleeve 80. Thus, the grooved wheels 106 are carried by each of the bearing plates 108 which constitute upper thrust and supporting rollers for the sleeve 80. A pair of lower thrust and supporting rollers in the form of grooved wheels 110 journaled upon a pin extending downwardly from the upper flange 86 so as to engage a lower flange 112 (Figures 10 and 14) formed annularly about the exterior surface of the hollow cylindrical sleeve 80, so that sleeve 80 is rotatably supported in pairs of spaced upper and lower thrust and supporting rollers 106 and 110, respectively.

A pair of oppositely disposed roller saw guides 114 (Figures 9, 11 and 13) are rotatably journaled in forks 116 pivotally mounted at the upper end of the sleeve 80. The rollers 114 are adapted to rotate in a common vertical plane. The roller saw guides 114 are provided for the purpose of contacting the opposite flat surfaces of the cutting blade 16 to maintain the cutting blade in its vertical path of movement while passing through the sleeve 80. For the purpose of further maintaining the cutting blade 16 in a vertical path of movement, another roller in the form of a grooved wheel 118 is carried by the interior surface of the sleeve 80 intermediate its ends. The roller saw guide 118 is journaled in a pair of laterally extending spaced parallel lugs 120 and at a point about the inner periphery of the sleeve 80 disposed 90° from the roller saw guides 114, and, of course, spaced some distance therefrom, the edge of the cutting blade 16 remote from the edge carrying the cutting teeth 17 guided in the groove provided centrally of the roller saw guides 114 so that the cutting blade or saw 16 will be assured of being maintained in its vertical path of movement. A plurality of sleeve thrust rollers 122 rotatably journaled in bearing plates 124 (Figure 14), similar to bearing plates 108, carried by the surface of the lower flange 88 in spaced parallel relation thereto with the sleeve thrust rollers 122 rotatable in a horizontal plane, the periphery of the rollers contacting the outer surface adjacent the lower end of the sleeve 80, so that the sleeve 80 is carried for rotation in a vertical plane by the pairs of grooved wheels 106 and 110 and guided in this rotation in a vertical plane by the plurality of sleeve thrust rollers 122 so as to insure a minimum of end play in the rotational movement of the sleeve 80.

A rectangular mounting plate 126 (Figures 4, 10 and 12) is integrally formed with and extends between the upper and lower flanges 86 and 88 parallel to and remote from the back plate 90, and is provided with a threaded opening 128 therethrough to receive the threaded stem of a locking thumb screw 130. The terminal end of the stem of the thumb screw remote from the head thereof will contact the peripheral surface of a flange or ring 132 carried on the external surface of the sleeve 80 and extending normally to the vertical axis of the sleeve 80, so that upon tightening of the thumb screw 130 so that it is in contact with the ring 132 and tightened so that the sleeve 80 will be prevented from rotational movement.

In operation, the lock nut 44 and the locking thumb screw 130 are backed off so that both the sleeves 40 and 80 may freely rotate in the respective upper and lower guide assemblies 18 and 20. As the arms 50 of the handle assembly 48 are rotated in a horizontal plane about the vertical axis through the sleeve 40, the cutting blade 16 will be rotated therewith, as previously described, and a certain twist imparted to the blade. The rotational movement of the handle assembly 48 will provide an established angular position of the cutting edge of the blade 16 with respect to the horizontal axis of the work table 12 so that a cut of any angle may be made in a sheet of material fed into the machine, the sheet of material resting upon the top surface of the work table 12. As the twist is imparted to the saw blade or cutting blade 16 to its established position with respect to the work table 12, the sleeve 80 in the lower guide assembly 20 will be rotated about the longitudinal axis of the blade responsive to the twist placed therein by rotation of the handle assembly 48 so as to maintain the cutting blade in a vertical path of movement in the determined established position, and hence will cooperate and act as a guide means for the cutting blade so that no twist of the blade will be present at the point where the vertical path of movement of the cutting blade intersects the horizontal plane of the work table 12; in effect, the cutting blade will provide a vertical cut in any sheet of material, or piece of material, fed into the machine upon the work table 12 and against the cutting edge 17 of the cutting blade 16. If for any reason, any established position, other than a right angular position between the vertical path of movement of the cutting blade and the horizontal plane of the work table is desired, the upper guide assembly may be rotated so as to place the blade in the desired angular position with respect to the work table 12. This, of course, will carry the lower guide assembly, and more specifically the sleeve 80 thereof, to a rotated position to maintain the cutting blade in a vertical position, and both the upper and lower guide assemblies may be maintained and locked by tightening the lock nut 44 on the upper guide assembly and the locking thumb screw 130 on the lower guide assembly.

From the foregoing, it will be evident that there has been provided in a contour sawing machine of the type having a cutting blade mounted to move in a vertical path and a horizontal work table supported on the machine and intersecting the path of movement of said blade, an attachment for guiding the blade comprising an upper guide assembly 18 and a lower guide assembly 20 carried by the upper and lower frame members respectively of the machine. The upper guide assembly 18 having means to angularly position the cutting edge of the blade 16 with respect to the horizontal axis of the table 12 at the point of intersection of the path of movement of the blade with the table, and the lower guide assembly 20 having a saw blade guide sleeve 80 mounted to rotate in the lower guide assembly about the longitudinal axis of the blade in response to a position established in the blade by the rotational movement of the upper guide assembly 18. It should also be noted that means are provided on both the upper and lower guide assemblies, in the nature of a lock nut 44 on the upper guide assembly and a locking thumb screw 130 on the lower guide assembly, to lock the upper and lower guide assemblies in any desired established position of the saw blade with respect to its angular disposition at its point of intersection with the horizontal table 12.

It should also be evident, that the attachment of the present invention permits an operator to perform a continuous cut upon a large sheet of material fed into the contour sawing machine which, in effect, will allow the machine to perform cuts in a sheet of material of almost twice the size of the depth of the throat of the machine without turning the work over and remarking or requiring the operator to work from an awkward position to either side of the machine, since all the cuts can be performed by the operator, in a continuous operation, by merely rotating the cutting blade 16 to follow the desired line of cut indicated on the sheet of material to be worked. It is also important to observe that the present attachment may be applied to existing contour sawing machines without any extensive modification of the existing machine other than to provide mounting holes for the attachment.

As shown in Figure 6, the upper guide assembly 18, and consequently the lower guide assembly 20, can be rotated in a circular path about the cutting blade as an axis in either a clockwise or counterclockwise direction, so that any cuts of an arcuate nature within a 360° radius may be accomplished easily and readily by an operator of the machine.

It should also be noted that the cylindrical portion 36 of the upper guide assembly housing 24 is provided with a bore therethrough into which the sleeve 40 is rotatably mounted, so that the sleeve 40 is rotatably carried in the upper guide assembly 18, and the grooved wheel 70, which serves to keep the blade from jumping out of the saw guides, is, in effect, carried by the sleeve 40 since the support block 54 of the handle assembly 48, as well as the assembly 48 itself, is carried by the sleeve 40. Thus, the grooved wheel 70 will be indirectly carried by the sleeve 40. In addition to keeping the blade from jumping out of the saw guides, the grooved wheel 70 will also act to impart a twist to the blade 16 as the sleeve 40 is rotated in its circular path about its longitudinal axis, aided in imparting this twist by the saw guides 62. The twist in the blade 16, initially imparted thereto by the rotation of the sleeve 40, will not remain in the blade 16, at least with respect to the intersection of the vertical path of movement of the blade 16 and the horizontal work table 12, since the lower guide assembly 20, and more specifically the sleeve 80 rotatable therein, may move in a circular path about the vertical axis of the blade as an axis to remove this twist from the blade.

While there is shown and described the preferred embodiment of the invention, it is to be understood that the structure is susceptible to change and modification within the practicability of the invention and therefore should be limited only by the scope of the claim appended hereto.

What is claimed is:

In a contour sawing machine of the type having a horizontal work table through which a flexible blade having a cutting edge moves vertically, and an upper and a lower frame intermediate which said work table is disposed; a rotary guide surrounding said blade and supported on said machine for rotation about the longitudinal axis of said blade, said guide comprising an upper guide assembly carried by said upper frame, said upper guide assembly including a saw blade guide sleeve rotatable about the longitudinal axis of said blade, a handle assembly carried by said sleeve for imparting rotation thereto, said handle assembly comprising a flange surrounding said sleeve intermediate its ends and fixedly secured to said sleeve, oppositely disposed arms carried by said flange and extending outwardly therefrom to define handles for manually imparting rotation to said sleeve and flange, a guide block partially surrounding said cutting blade and dependingly carried by said flange, a guide wheel rotatably mounted on said block and contacting the edge of said blade remote from the cutting edge thereof, cutting blade guides slidably mounted in said block on opposite sides of said blade for movement in converging rectilinear paths toward and away from said blade, means for securing said cutting blade guides in a selected position in their paths of movement to contact opposite sides of said blade, and means carried by said support block contacting the cutting edge thereof to prevent the blade from moving out of contact from its contact with said guide wheel and said cutting blade guides, said handles manually operable for rotating said guide wheel and said saw guides to impart a twist to said blade to establish a desired position of angular relation between the cutting edge of said blade and said work surface, and a lower guide assembly carried by said lower frame and having saw blade guiding means freely rotatable about the longitudinal axis of said blade so as to guide the cutting edge of said blade in a vertical path through said work surface in said desired angular position in response to the twist imparted thereto by said upper guide assembly.

References Cited in the file of this patent

UNITED STATES PATENTS

| 118,041 | Moore | Aug. 15, 1871 |
| 407,211 | Hyde | July 16, 1889 |
| 2,311,426 | Wilkie | Feb. 16, 1943 |
| 2,490,281 | Rose | Dec. 6, 1949 |
| 2,670,767 | Miller | Mar. 2, 1954 |
| 2,705,510 | Stocke | Apr. 5, 1955 |

FOREIGN PATENTS

| 458,715 | Germany | Apr. 19, 1928 |
| 608,767 | Great Britain | Sept. 21, 1948 |